United States Patent
Yoo

(10) Patent No.: US 12,256,248 B2
(45) Date of Patent: Mar. 18, 2025

(54) DERIVATION OF CHANNEL FEATURES USING A SUBSET OF CHANNEL PORTS

(71) Applicant: QUALCOMM Incorporated, San Diego, CA (US)

(72) Inventor: Taesang Yoo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 229 days.

(21) Appl. No.: 17/450,245

(22) Filed: Oct. 7, 2021

(65) Prior Publication Data
US 2023/0113557 A1    Apr. 13, 2023

(51) Int. Cl.
*H04B 7/06* (2006.01)
*H04L 5/00* (2006.01)
*H04W 24/08* (2009.01)

(52) U.S. Cl.
CPC .......... *H04W 24/08* (2013.01); *H04B 7/0626* (2013.01); *H04L 5/0048* (2013.01)

(58) Field of Classification Search
CPC .... H04B 7/0456; H04B 7/061; H04B 7/0617; H04B 7/0626; H04B 7/0658; H04L 5/0023; H04L 5/0048; H04L 5/0073; H04W 24/08; H04W 24/10; H04W 72/046; H04W 72/0446
See application file for complete search history.

(56) References Cited

U.S. PATENT DOCUMENTS

| | | | | |
|---|---|---|---|---|
| 2015/0092875 | A1* | 4/2015 | Kim | H04B 7/0632 375/267 |
| 2016/0080052 | A1* | 3/2016 | Li | H04B 7/0632 375/267 |
| 2019/0349057 | A1* | 11/2019 | Davydov | H04B 7/0626 |
| 2021/0067978 | A1 | 3/2021 | Cheraghi et al. | |
| 2021/0235513 | A1* | 7/2021 | Kim | H04W 74/0816 |
| 2023/0089191 | A1* | 3/2023 | Davydov | H04W 8/08 370/329 |
| 2023/0109063 | A1* | 4/2023 | Wang | H04B 7/0626 370/252 |
| 2024/0056147 | A1* | 2/2024 | Faxer | H04L 5/005 |

OTHER PUBLICATIONS

International Search Report and Written Opinion dated Dec. 12, 2022 from corresponding PCT Application No. PCT/US2022/077040.

(Continued)

*Primary Examiner* — Michael Thier
*Assistant Examiner* — Prince A Mensah
(74) *Attorney, Agent, or Firm* — ArentFox Schiff LLP

(57) ABSTRACT

In one aspect of the disclosure, a method, a computer-readable medium, and an apparatus are provided. The apparatus may be a user equipment (UE) or a component thereof. The apparatus may be configured to receive pilot signals from a base station on a first subset of a set of antenna ports of a channel. The apparatus may be further configured to measure a first set of values corresponding to the first subset of the set of antenna ports based on receiving the pilot signals transmitted from the base station on the first subset of the set of antenna ports. The apparatus may be further configured to derive a second set of values corresponding to a second subset of the set of antenna ports of the channel based on receiving the pilot signals on the first subset of the set of antenna ports.

30 Claims, 10 Drawing Sheets

(56) References Cited

OTHER PUBLICATIONS

Sapavath Naveen Naik et al: "Machine Learning for RF Slicing Using CSI Prediction in Software Defined Large-Scale MIMO Wireless Networks", IEEE Transactions on Network Science and Engineering, IEEE, vol. 7, No. 4, May 11, 2020 (May 11, 2020), pp. 2137-2144, XP011835849, DOI: 10.1109/TNSE.2020.2993984 [retrieved on Dec. 30, 2020].

* cited by examiner

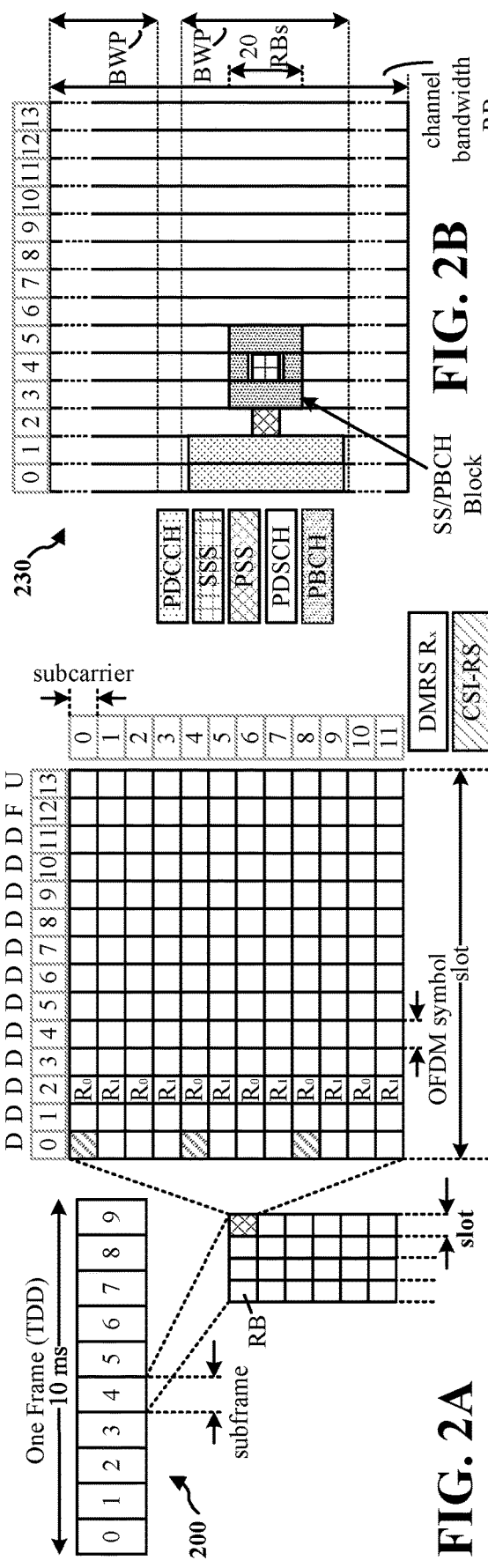
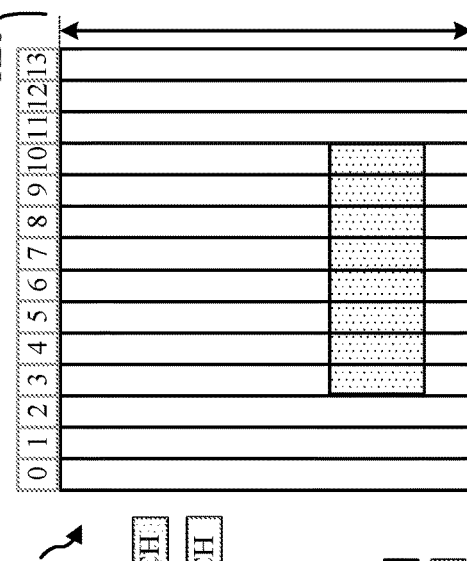
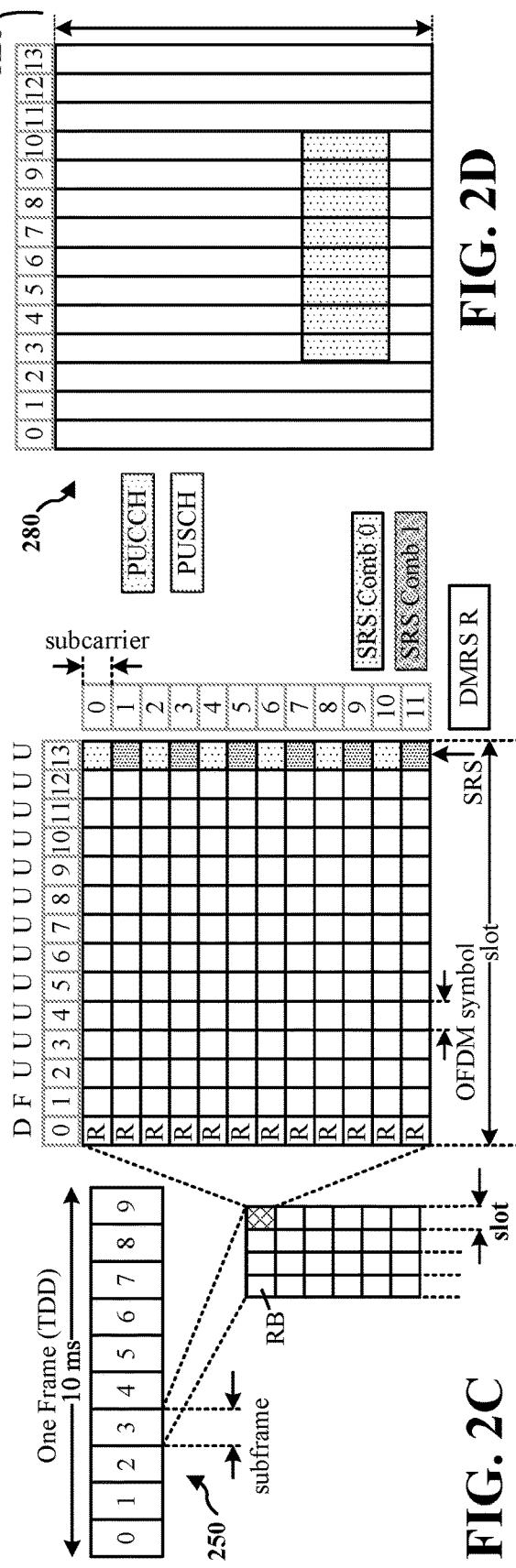

DERIVATION OF CHANNEL FEATURES USING A SUBSET OF CHANNEL PORTS

BACKGROUND

Technical Field

The present disclosure generally relates to communication systems, and more particularly, to a UE configured to report information related to channel features when some pilot signals are configured to be virtual by a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect of the disclosure, a method, a computer-readable medium, and an apparatus are provided. The apparatus may be a user equipment (UE) or a component thereof. The apparatus may be configured to receive pilot signals from a base station on a first subset of a set of antenna ports of a channel. The apparatus may be further configured to measure a first set of values corresponding to the first subset of the set of antenna ports based on reception of the pilot signals transmitted from the base station on the first subset of the set of antenna ports. The apparatus may be further configured to derive a second set of values corresponding to a second subset of the set of antenna ports of the channel based on reception of the pilot signals on the first subset of the set of antenna ports.

In another aspect of the disclosure, another method, another computer-readable medium, and another apparatus are provided. The other apparatus may be a base station or a component thereof. The other apparatus may be configured to transmit pilot signals to a UE on a first subset of a set of antenna ports of a channel without transmission of the pilot signals on a second subset of the set of antenna ports of the channel. The other apparatus may be further configured to receive, from the UE, information derived from values corresponding to the second subset of the set of antenna ports of the channel based on transmission of the pilot signals on the first subset of the set of antenna ports of the channel without transmission of the pilot signals on the second subset of the set of antenna ports of the channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
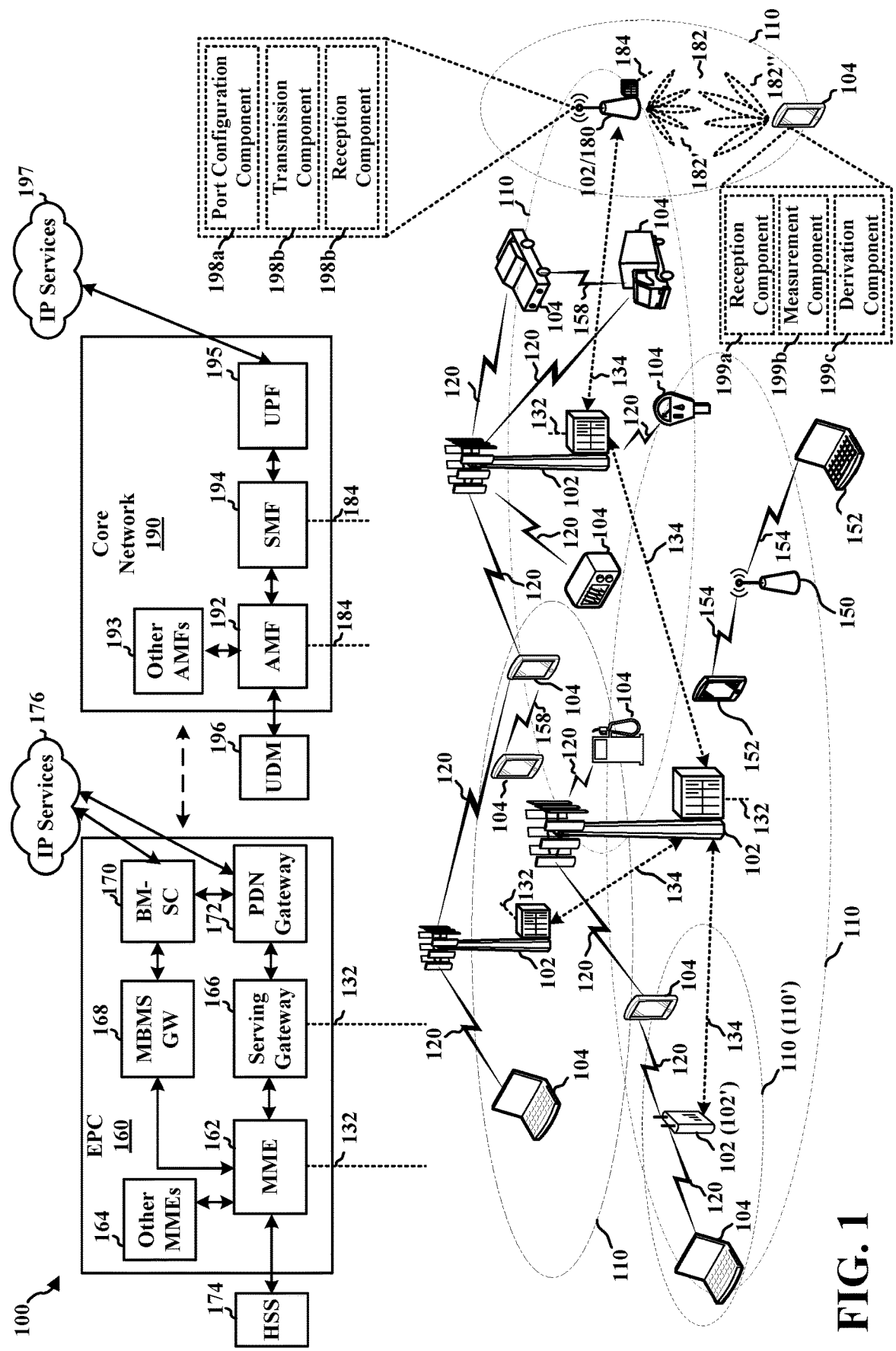
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, a person having ordinary skill in the art will recognize that these concepts and related aspects may be implemented in the absence of some or all of such specific details. In some instances, well-known structures, components, and the like are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

In many wireless communications environments, a relatively large number of antennas may be used to communicate between various systems and devices, such as base stations and user equipment (UE). For example, millimeter wave (mmW) and multiple-input multiple-output (MIMO), and massive MIMO in particular, may feature channels with an appreciable number of antennas at each of the transmitter and the receiver.

With such antenna configurations, an underlying channel between a base station and a UE may be modeled based on a matrix having a dimension equal to the number of transmit (TX) antennas (e.g., of the base station) multiplied by the number of receive (RX) antennas (e.g., of the UE) for each time/frequency resource. Therefore, the underlying channel may be of a relatively high dimension.

Due to the higher dimensionality of the underlying channel matrix, utilizing each antenna for channel estimation, precoding, and the like may be complex and expensive (e.g., in terms of resource consumption). For example, massive MIMO configurations may rely upon uplink channel sounding in order to obtain a precoded channel of a lower dimension. However, the overhead costs for uplink channel sounding (e.g., where a UE transmits sounding reference signals to sound over ports) may be undesirably, or even prohibitively, high, especially with higher numbers of UEs and/or increased UE antenna complexity.

With mmW communication, analog beamforming may provide a lower dimensional beamformed channel. However, analog beamforming may be relatively expensive and/or resource intensive with respect to radio frequency (RF) chains, e.g., as many or even all RF chains may be employed for beam refinement according to which directional beams may be selected. The allocation of RF chains in this manner may prevent or delay communication in directions and/or on streams that are dependent on RF chains already allocated to other analog beamforming.

Moreover, signal transmission on an underlying high-dimensional channel may increase network load and congestion. Illustratively, the volume of transmitted signals on an underlying high-dimension channel may be nonnegligible and may overlap or conflict with other transmissions on some common or shared resources. Thus, the signaling overhead and associated resource consumption have the potential to interfere with other transmissions, with such interference becoming more pronounced in higher dimensions. Even apart from the network load, transmission and reception of such signals may consume processing power and/or cycles at the transmitter (e.g., base station) and receiver (e.g., UE), respectively, to the exclusion of some other operations. In any context, the potential for additional latency may be increased at one or more of the transmitter, receiver, or another device, which may complicate or hinder adherence delay budgets and/or use cases, such as ultra-reliable low-latency communications (URLLC) and the like.

Examples such as massive MIMO and mmW communication evince the role of higher dimensionalities as a substantial factor in the overhead incurred through use of underlying channels. In view of this, wireless and radio access networks (and devices operating therein) may benefit from mechanisms that reduce the overhead that is otherwise commensurate with the number of TX antennas.

The present disclosure describes various techniques and solutions in which an underlying channel may be utilized (e.g., for channel estimation) with a reduction in some or all of the above-described overhead associated with signaling on high-dimensional underlying channels. Specifically, the present disclosure provides for the virtualization of a subset of the ports on which the underlying channel is configured.

As further described below, physical signals (e.g., pilot signals) may not be transmitted on such virtual ports—that is, signaling for a high-dimensional underlying channel may be reduced as signals may be absent on the virtual ports.

However, the virtual ports may still be integrated into measurements for the underlying channel, and approaches to doing so are further described herein. Such port virtualization may result in a reduced network load, signaling overhead, and so forth.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired, wireless, or some combination thereof. At least some of the base stations 102 may be configured for integrated access and backhaul (IAB). Accordingly, such base stations may wirelessly communicate with other base stations, which also may be configured for IAB.

At least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, a CU may implement some or all functionality of a radio resource control (RRC) layer, whereas a DU may implement some or all of the functionality of a radio link control (RLC) layer.

Illustratively, some of the base stations 102 configured for IAB may communicate through a respective CU with a DU of an IAB donor node or other parent IAB node (e.g., a base station), and further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. With such a connection to the EPC 160 and/or core network 190, a base station 102 operating as an IAB donor may provide a link to the EPC 160 and/or core network 190 for one or more UEs and/or other IAB nodes, which may be directly or indirectly connected (e.g., separated from an IAB donor by more than one hop) with the IAB donor. In the context of communicating with the EPC 160 or the core network 190, both the UEs and IAB nodes may communicate with a DU of an IAB donor. In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110, which may also be referred to as a "cell." Potentially, two or more geographic coverage areas 110 may at least partially overlap with one another, or one of the geographic coverage areas 110 may contain another of the geographic coverage areas. For example, the small cell 102' may have a coverage area 110' that overlaps with the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. Wireless links or radio links may be on one or more carriers, or component carriers (CCs). The base stations 102 and/or UEs 104 may use spectrum up to Y megahertz (MHz) (e.g., Y may be equal to or approximately equal to 5, 10, 15, 20, 100, 400, etc.) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MME) at the core network level, and the UE may be configured to receive downlink control information in the access network (e.g., the UE may be in an RRC Connected state). In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz," "sub-7 GHz," and the like, to the extent used herein, may broadly represent frequencies that may be less than 6 GHz, frequencies that may be less than 7 GHz, frequencies that may be within FR1, and/or frequencies that may include mid-band frequencies. Further, unless specifically stated otherwise, the term "millimeter wave" and other similar references, to the extent used herein, may broadly represent frequencies that may include mid-band frequencies, frequencies that may be within FR2, and/or frequencies that may be within the EHF band.

A base station 102, whether a small cell 102' or a large cell (e.g., macro base station), may include and/or be referred to as an eNB, gNodeB (gNB), or another type of base station. Some base stations 180, such as gNBs, may operate in a traditional sub 6 GHz spectrum, in mmW frequencies, and/or near-mmW frequencies in communication with the UE 104. When such a base station 180 operates in mmW or near-mmW frequencies, the base station 180 may be referred to as a mmW base station. The (mmW) base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a base station 102/180 may include, inter alia, a port configuration component 198a, a transmission component 198b, and a reception component 198c. Further, a UE 104 may include, inter alia, a reception component 199a, a measurement component 199b, and a derivation component 199c.

At the base station, the port configuration component 198a may configure a set of antenna ports of a channel for pilot signals, such as channel state information (CSI) reference signals (RSs) (CSI-RSs), synchronization signal blocks (SSBs), or another type of pilot signal. In particular, the port configuration component 198a may configure transmission of the pilot signals on a first subset of the set of antenna ports.

The port configuration component 198a may configure a second subset of the set of antenna ports as virtual ports. A virtual port may include a port on which no pilot signal is transmitted, but is considered in conjunction with other antenna ports on which physical signal transmission is configured—e.g., virtual ports may be incorporated into operations associated with channel estimation, beam refinement, and so forth. Therefore, the first and second subsets of antenna ports are non-overlapping, as physical transmission of pilot signals on ports (e.g., as with the first subset of antenna ports) and virtualization of ports (e.g., as with the second subset of antenna ports) may be mutually exclusive.

In the aggregate, the first and second subsets of ports define the set of ports of an underlying channel, which may include at least one physical channel, a wireless transmission medium, etc. on which the base station 102/180 and UE 104 communicate. The transmission component 198b of the base station 102/180 may be configured to transmit pilot signals to the UE 104 on the first subset of the set of antenna ports of the underlying channel without transmitting pilot signals on the second subset of the set of antenna ports of the channel. Correspondingly, the reception component 199a of the UE 104 may be configured to receive the pilot signals from the base station 102/180 on the first set of antenna ports of the channel.

At the UE 104, the measurement component 199b may be configured to measure a first set of values corresponding to a first subset of antenna ports of the underlying channel based on receiving the pilot signals transmitted by the base station 102/180 on the first subset of antenna ports (and without receiving any pilot signals on the second subset of antenna ports of the underlying channel). Further, the derivation component 199c may be configured to derive a second set of values corresponding to the second subset of antenna ports of the underlying channel based on receiving the pilot signals transmitted by the base station 102/180 on the first subset of antenna ports (and without any pilot signals being transmitted by the base station 102/180 on the second subset of antenna ports of the underlying channel).

In some aspects, the UE 104 may be configured to transmit, to the base station 102/180, information that is based on the first and second sets of values, which may include information derived from values (e.g., the second set of values) corresponding to the second subset of the set of antenna ports of the underlying channel. For example, the UE 104 may estimate or otherwise measure the underlying channel using the first and second sets of values in order to obtain CSI, which the UE 104 may report to the base station 102/180 for the underlying channel. Additionally or alternatively, the UE 104 may select or identify one or more antenna ports corresponding to the "best" beamforming direction(s) for communication on the underlying channel, such as by selecting or identifying the antenna port(s) corresponding to the highest RS received power (RSRP) and/or signal-to-noise ratio (SNR) values among the first and/or second sets of values. The UE 104 may report information indicating at least one directional beam corresponding to at least one of the first and/or second subsets of antenna ports to the base station 102/180 based on the first and second sets of values.

Correspondingly, the reception component 198c of the base station 102/180 may receive, from the UE 104, the information that is that is based on the first and second sets of values, which may include information derived from values (e.g., the second set of values) corresponding to the second subset of the set of antenna ports of the underlying channel. Potentially, the base station 102/180 may configure some communication with the UE 104 based on the received information. For example, the base station 102/180 may configure directional beamforming for communication with the UE 104 based on the information received from the UE 104.

Various other aspects related to configuration of antenna ports and communication on high-dimensional channels are further described herein. Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kilohertz (kHz), μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (μs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot signal, such as an RS, for the UE. Broadly, RSs may be used for beam training and management, tracking and positioning, channel estimation, and/or other such purposes. In some configurations, an RS may include at least one demodulation RS (DM-RS) (indicated as $R_x$ for one particular configuration, where 100x is the port number, but other DM-RS configurations are possible) and/or at least one CSI-RS for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
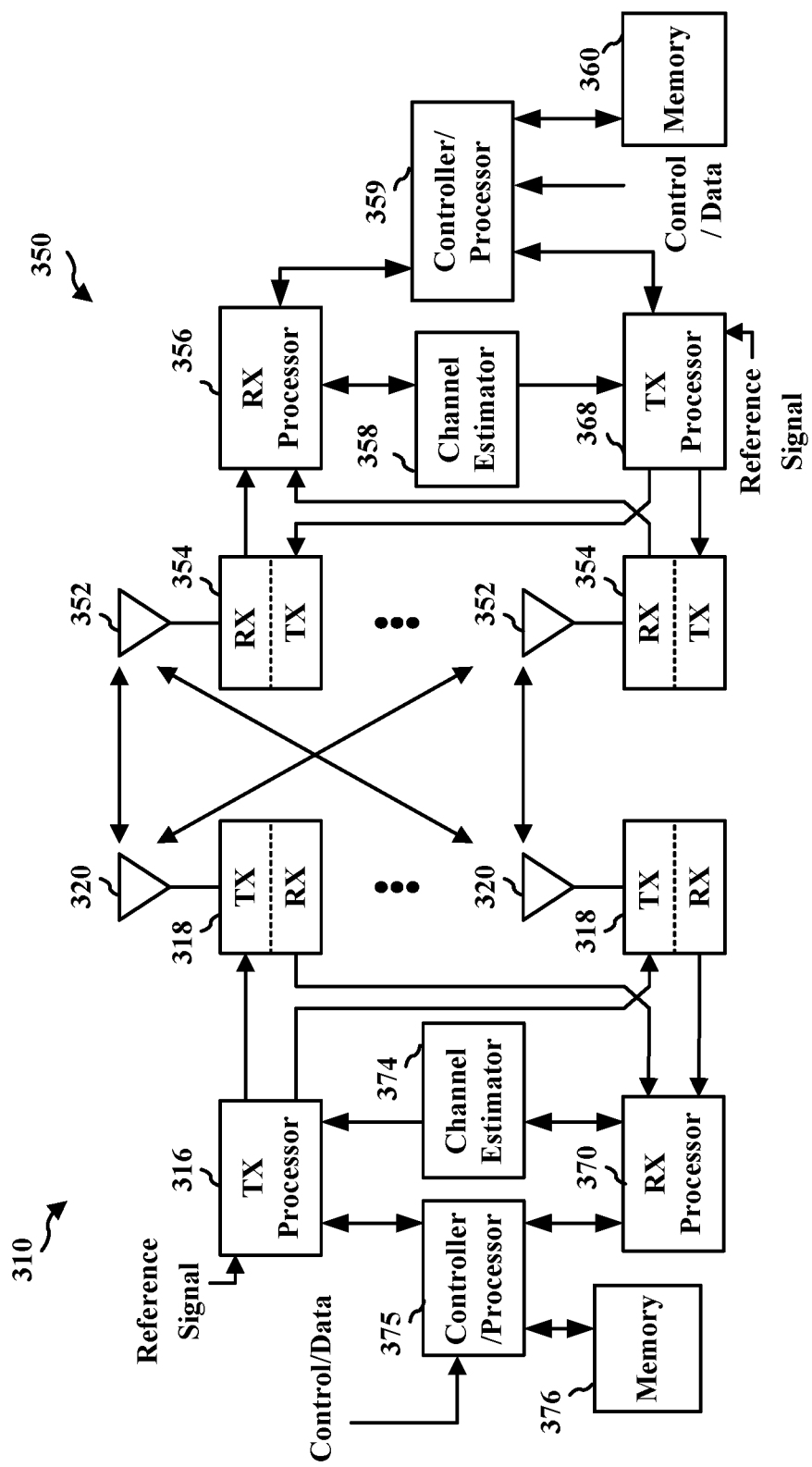
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a RF carrier with a respective spatial stream for transmission.

At the UE 350, each receiver 354RX receives a signal through at least one respective antenna 352. Each receiver 354RX recovers information modulated onto an RF carrier and provides the information to the RX processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through at least one respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with 199a, 199b, and/or 199c of FIG. 1.

In some other aspects, at least one of the TX processor 316, the RX processor 370, and the controller/processor 375 may be configured to perform aspects in connection with 198a, 198b, and/or 198c of FIG. 1.

Figure 4:
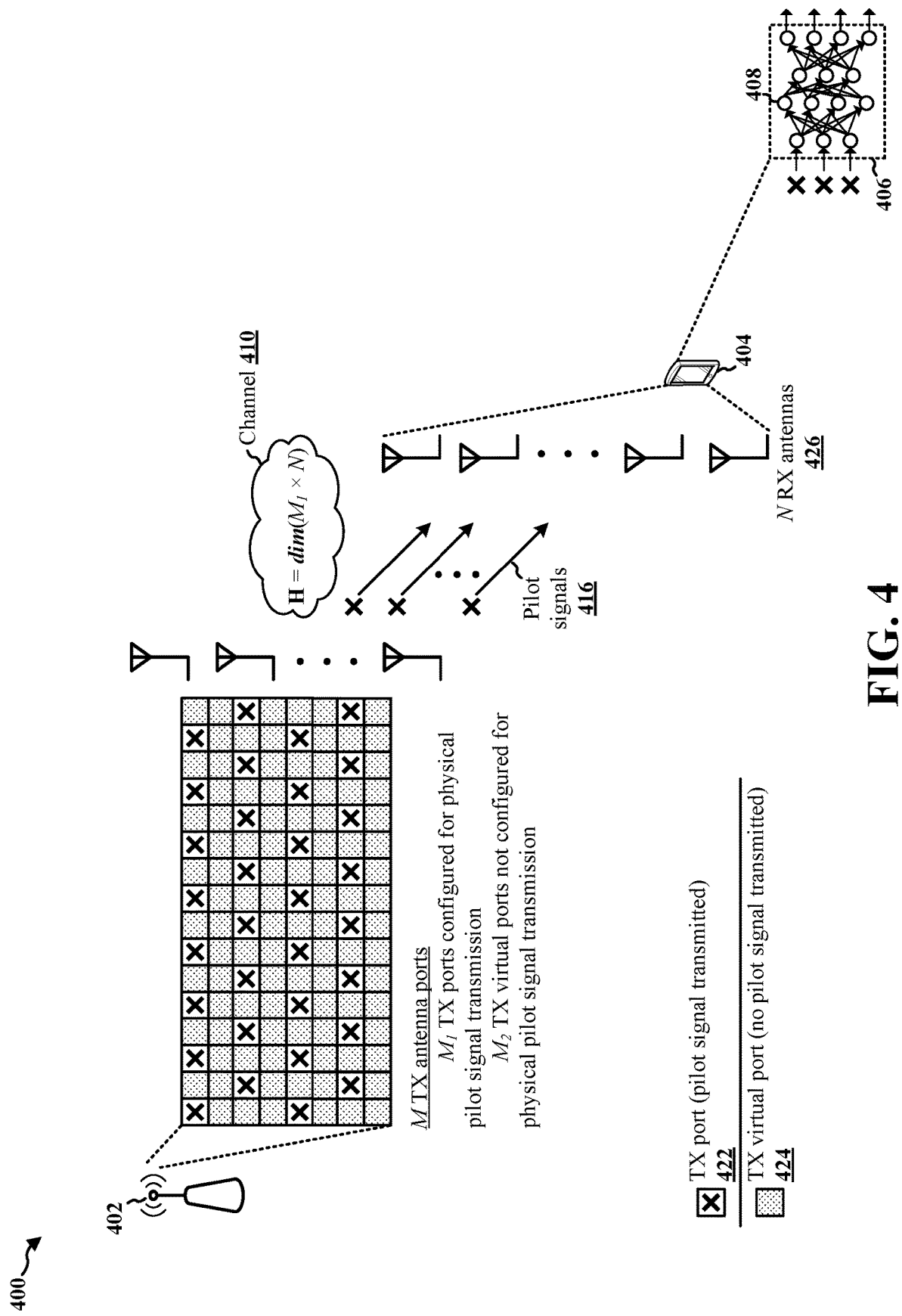
FIG. 4 is a block diagram illustrating an example of port virtualization for pilot signals transmitted by a base station to a UE.

FIG. 4 is a block diagram 400 illustrating an example of port virtualization for pilot signals 416 transmitted by a base station 402 to a UE 404. The base station 402 and the UE 404 may communicate on an underlying channel 410 (e.g., the channel H) having a dimensionality equal to the product of the number of configured TX antennas at the base station 402 multiplied by the number of RX antenna at the UE 404.

As illustrated, the base station 402 may configure antenna ports for communication with the UE 404 as either (1) a port 422 on which a pilot signal is transmitted (which may also be referred to as a "physical port"), or (2) a virtual port 424 on which no pilot signal is transmitted to the UE 404. The base station 402 may transmit information indicating this configuration to the UE 404. In some aspects, the base station 402 may further transmit, to the UE 404, information indicating the relationship between a first subset of a set of antenna ports (e.g., the TX physical ports 422) of a channel 410 and a second subset of the set of antenna ports (e.g., the TX virtual ports 424) of the channel 410. Correspondingly, the UE 404 may receive the information indicating at least one of: the ports 422 on which physical pilot signal transmission is configured, the virtual ports 424 on which no physical pilot signal is transmitted to the UE 404, and/or information indicating the relationship between the ports 422 on which the physical pilot signals 416 are transmitted and the virtual ports 424 on which no pilot signals are transmitted to the UE 404 when (or in association with) the pilot signals 416 are transmitted on the physical ports 422.

Potentially, the information indicating the relationship between the ports 422 and the virtual ports 424 may be based on historical data observed from previous transmissions of pilot signals. For example, in historical datasets, some or all of the virtual ports may have been configured as physical ports (on which signal transmission occurred) for transmission of earlier sets of pilot signals. In another example, some or all of the physical ports may have been configured as virtual ports (on which no signal transmission occurred) for transmission of earlier sets of pilots signals from other ports previously configured as physical ports.

Either or both of the base station 402 and/or the UE 404 may collect and process such historical data to determine the relationship between the physical ports 422 and the virtual ports 424. Additionally or alternatively, information indicating the relationship between the physical ports 422 and the virtual ports 424 may be preconfigured in the UE 404 or the base station 402.

In some aspects, the base station 402 may further transmit, and the UE 404 may further receive, beamforming information indicating at least one of directional beams of the base station 402 corresponding to the TX physical ports 422 and the TX virtual ports 424, or a relationship between the TX physical ports 422 and the TX virtual ports 424.

With the physical ports 422 and the virtual ports 424 respectively configured, the base station 402 may transmit pilot signals 416 to the UE 404 on the TX physical ports 422. The pilot signals may include CSI-RSs and/or SSBs. The UE 404 may correspondingly receive the pilot signals 416 over the underlying channel 410 (e.g., the channel H) on the RX antennas 426. No pilot signals 416 may be transmitted on the virtual ports 424.

The UE 404 may measure a first set of values corresponding to the TX physical ports 422 based on receiving the pilot signals 416 on the RX antennas 426. For example, the UE 404 may detect the pilot signals 416 on some or all of the RX antennas 426, such as an RS intended for the UE 404 (e.g., a CSI-RS scrambled with a code or other information indicating the RS is intended for the UE) and/or an SSB that is broadcast in a cell operated by the base station (e.g., an SSB having an identifier associated with the cell). The UE 404 may measure the energy with which each pilot signal 416 is received on at least one RX antenna 426 to obtain a value corresponding to the pilot signal, e.g., in order to obtain an RSRP or SNR.

The UE 404 may also derive a second set of values corresponding to the virtual ports 424 of the channel 410 based on receiving the pilot signals 416 on the RX antennas 426. For example, the UE 404 may estimate the second set of values associated with the virtual ports 424 using the pilot signals 416 transmitted by the base station 402 on the physical ports 422, e.g., based on a relationship between the physical ports 422 and the virtual ports 424.

In some aspects, the UE 404 may include a neural network 406, such as a neural network having a plurality of activation functions 408 (e.g., sigmoid functions). The neural network may include, for example, one or more fully connected layers and/or one or more convolutional layers, or the neural network may include another type of neural network and/or machine learning algorithm(s). The neural network 406 may be trained to output the second set of values. For example, the neural network 406 may include a weight matrix that is trained based on training data including received pilot signals as input and a set of values at output. In some aspects, neural network 406 may be trained based on a relationship between the physical ports 422 and the virtual ports 424. In some other aspects, the neural network 406 may be trained based on training data that includes another set of pilot signals on the physical ports 422 and the virtual ports 424. For example, training data on which the neural network 406 is trained may be based on data observed from one or more previous sets of pilot signals transmitted on at least a portion of the set of antenna ports 422, 424 and/or based on information indicating a relationship between the physical ports 422 and the virtual ports 424.

The UE 404 may obtain the second set of values as output of the neural network 406 based on providing the pilot signals 416 transmitted on the physical ports 422 as input to the neural network 406. For example, the UE 404 may obtain an output of the neural network 406 indicative of the second set of values, and the UE may associate each of the second set of values with a respective one of the virtual ports 424. In some aspects, the UE 404 may determine information to report to the base station 402 based on the second set of values output from the neural network 406. For example, the UE 404 may obtain the second set of values as the output of the neural network 406, and then the UE may generate a CSI report (e.g., RI, PMI, CQI) using one or both of the first set of values and the second set of values or the UE 404 may select or identify one or more one or more antenna ports corresponding to one or more directional beams of the base station 402 based on the first and second sets of values.

The UE 404 may then report information associated with the channel 410 to the base station 402 based on the first set of values and the second set of values. For example, where the pilot signals 416 include CSI-RSs, the UE 404 may transmit CSI associated with the channel 410 to the base station 402 based on the first set of values and the second set of values. In another example, where the pilot signals 416 include SSBs, the UE 404 may transmit information indicating at least one directional beam corresponding to at least one antenna port of the physical antenna ports 422 and/or the virtual antenna ports 424 based on the first set of values and the second set of values. In such an example, the UE 404 may report the information indicating at least one directional beam to the base station 402 further based on the received beamforming information that indicates at least one of directional beams of the base station 402 corresponding to the physical ports 422 and/or virtual ports 424, or the relationship between the physical ports 422 and the virtual ports 424.

Figure 5:
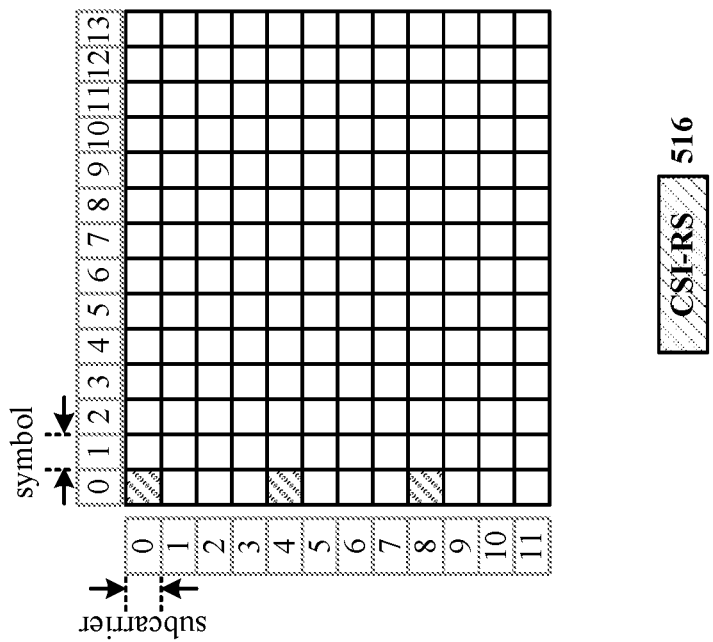
FIG. 5 is a block diagram illustrating an example of pilot signals that may be physically transmitted on some ports and may not be transmitted on virtual ports.

FIG. 5 is a block diagram 500 illustrating an example of pilot signals that may be physically transmitted on some ports and may not be transmitted on virtual ports. In some aspects of the present disclosure, the pilot signals transmitted by a base station to a UE on the first subset of a set of antenna ports may include CSI-RSs 516. The CSI-RSs 516 may be transmitted on one or more subcarriers in at least one symbol (e.g., an OFDM symbol) of a resource grid of each of the first subset of antenna ports. In the illustrated aspect, a CSI-RS 516 may occupy three subcarriers in the first symbol of a slot. For example, a CSI-RS 516 may occupy the first subcarrier (e.g., subcarrier index 0), the fifth subcarrier (e.g., subcarrier index 4), and the ninth subcarrier (e.g., subcarrier index 8).

In the context of FIG. 4, the base station 402 may transmit a CSI-RS 516 on each of the TX physical ports 422. The UE 404 may then receive a CSI-RS 516 over the underlying channel 410 on the RX antennas 426. However, no CSI-RS 516 may be transmitted by the base station 402 on the TX virtual ports 424, and therefore, no CSI-RS may be received from the base station 402 by the UE 404 on the RX antennas 426 in association with any of the virtual ports 424. Rather, the UE 404 may use the CSI-RSs 516 transmitted by the base station 402 on the TX physical ports 422 (and received on the RX antennas 426) to determine (e.g., infer or approximate) estimations of CSI-RSs on the TX virtual ports 424 at some or all of the RX antennas 426.

The UE 404 may then use the combination of the measurements and the estimations in the aggregate in order to generate CSI (e.g., PMI, RI, CQI) or other channel estimation value(s) associated with the underlying channel 410. In other words, the UE 404 may treat the estimations as if the estimations were measurements observed from transmission of both TX physical ports 422 and TX virtual ports 424, even though no CSI-RS has been transmitted on the TX virtual ports 424.

The UE 404 may report (e.g., transmit) the CSI or other channel estimation value(s) associated with the underlying channel 410 to the base station 402. The base station 402 may treat the CSI or other channel estimation value(s) associated with the underlying channel 410 as valid for the entire channel 410, including the TX virtual ports 424, even though no CSI-RS is transmitted on the virtual ports. For example, based on the CSI or other reported information received from the UE 404, the base station 402 may estimate the underlying channel 410 with the high dimensionality of (number of TX physical ports 422+number of TX virtual ports 424)×(number of RX antennas 426) and/or may configure communication with the UE 404, such as by scheduling a data transmission to the UE 404 over the underlying channel 410 and/or by configuring a data rate, code rate, and/or a modulation order for a data transmission.

Figure 6:
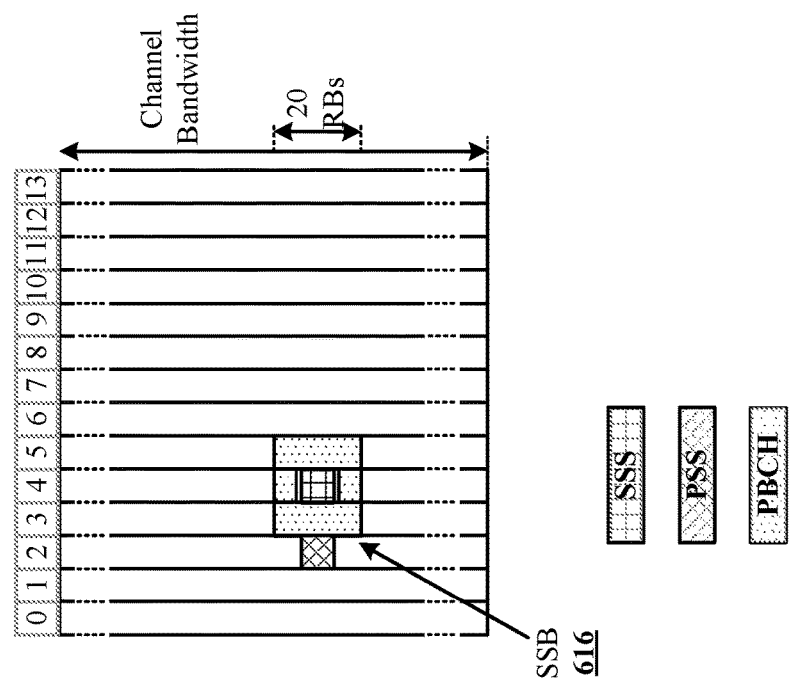
FIG. 6 is a block diagram illustrating another example of pilot signals that may be physically transmitted on some ports and may not be transmitted on virtual ports.

FIG. 6 is a block diagram 600 illustrating another example of pilot signals that may be physically transmitted on some ports and may not be transmitted on virtual ports. In some other aspects of the present disclosure, the pilot signals transmitted by a base station to a UE on the first subset of a set of antenna ports may include SSBs 616. An SSB 616 may include a PSS, an SSS, and potentially, some broadcast information on a PBCH. For the aforementioned an antenna port of the first subset of antenna ports, a resource grid may include an SSB 616 that is transmitted on a BWP configured (and active) for the UE 404 in multiple symbols of a slot. For example, an SSB 616 may occupy 20 RBs in a configured BWP of a channel bandwidth in the frequency domain, whereas in the time domain, the SSB 616 may occupy four symbols, such as the third through sixth symbols (e.g., symbols indices 2 through 5) or another set of symbols.

In the context of FIG. 4, the base station 402 may transmit an SSB 616 on each of the TX physical ports 422. The UE 404 may then receive an SSB 616 over the underlying channel 410 on the RX antennas 426. However, no SSB 616 may be transmitted by the base station 402 on the TX virtual ports 424, and therefore, no SSB may be received from the base station 402 by the UE 404 on the RX antennas 426. Rather, the UE 404 may the SSB 616 transmitted by the base station 402 on the TX physical ports 422 to determine (e.g., infer or approximate) estimations of SSBs on the TX virtual ports 424.

The UE 404 may then use the combination of the measurements and the estimations in the aggregate in order to identify or select at least one directional beam(s) for use with the underlying channel 410, such as the "best" or "recommended" directional beam(s). In other words, the UE 404 may treat the estimations as if the estimations were measurements observed from SSB transmission from the TX virtual ports 424, even though no SSB has been transmitted from the TX virtual ports 424.

The UE 404 may select or identify a directional beam(s) by measuring or estimating an RSRP and/or SNR for SSB across both TX physical ports and TX virtual ports. That is, the UE 404 may measure the RSRP and/or SNR for SSBs 616 transmitted from the TX physical ports 422. The UE 404 may also use the SSBs 616 transmitted on the TX physical ports 422 to determine estimations of the RSRP and/or SNR values corresponding to each of the TX virtual ports 424, e.g., as though an SSB were transmitted on those TX virtual ports 424.

The UE 404 may compare the values and estimations of RSRPs and/or SNRs across all ports 422, 424. The UE 404 may select one or more of all of the ports 422, 424 based on the comparison. For example, the UE 404 may select one or more of all of the ports 422, 424 having the highest RSRPs and/or SNRs relative to other ports.

The UE 404 may report (e.g., transmit) information indicating at least one directional beam of the base station 402, which may be indexed by at least one of the physical ports 422 and/or the virtual ports 424. The at least one directional beam may correspond to at least one of the ports 422, 424 for which one or more of the highest RSRP and/or SNR values is measured or estimated.

The UE 404 may report (e.g., transmit) the information indicating the selected directional beam (corresponding to one or more of the physical ports 422 and/or virtual ports 424 associated with the underlying channel 410) to the base station 402. The base station 402 may assume the reported information associated with the underlying channel 410 corresponds to the directional beam(s) having the best or recommended quality for communication with the UE 404 on the underlying channel 410, even though no SSB is transmitted on the virtual ports 424. For example, based on the information received from the UE 404, the base station 402 may configure one or more serving or active beams and/or one or more candidate beams for communication with the UE 404 on the underlying channel 410 with the high dimensionality corresponding to (number of TX physical ports 422+number of TX virtual ports 424)×(number of RX antennas 426).

Figure 7:
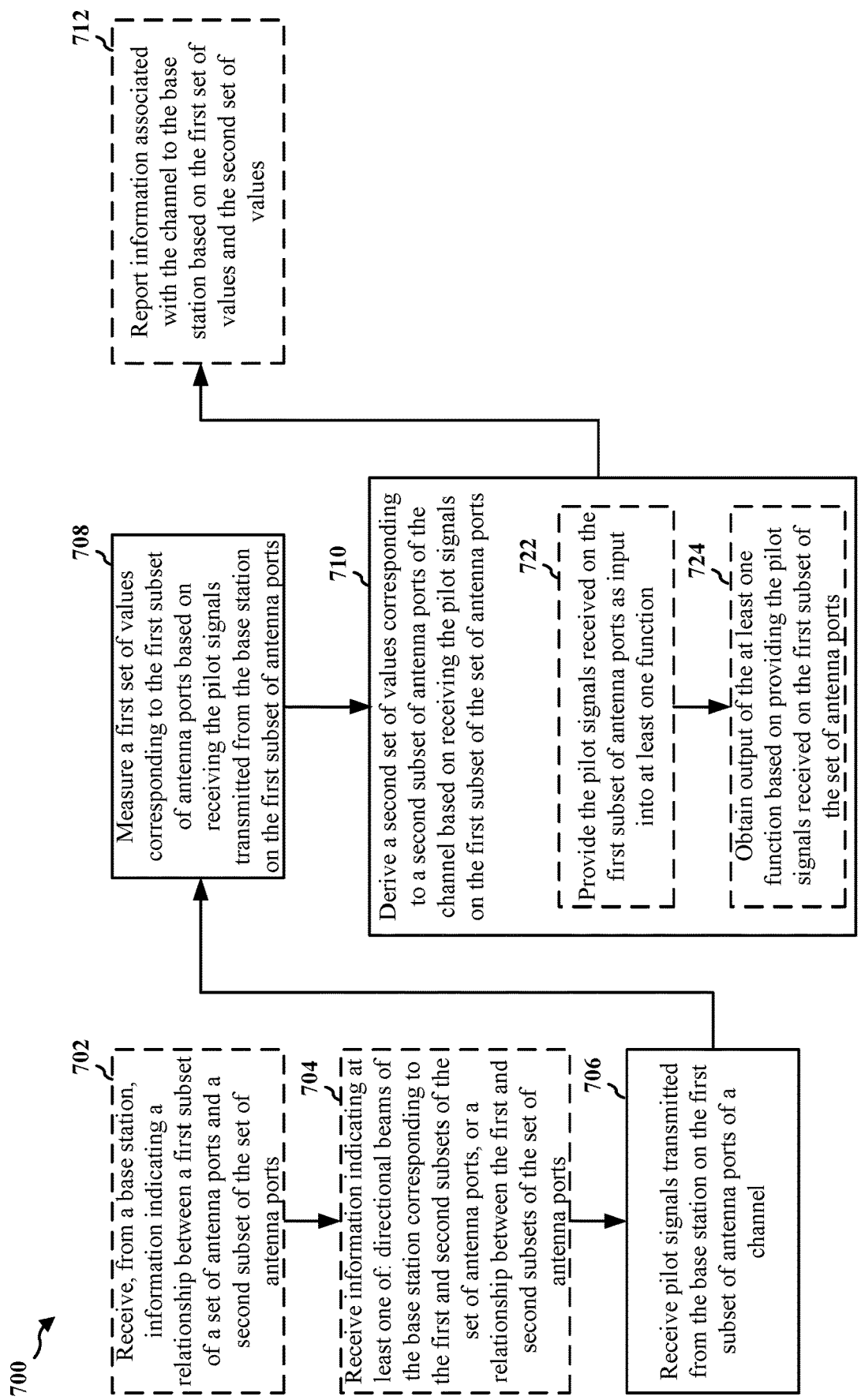
FIG. 7 is a flowchart illustrating an example of a method of wireless communication at a UE.

FIG. 7 is a flowchart 700 of a method of wireless communication. The method may be performed by or at a UE (e.g., the UE 104, 350, 404), another wireless communications apparatus (e.g., the apparatus 802), or one or more components thereof. According to various different aspects, one or more of the illustrated blocks may be omitted, transposed, and/or contemporaneously performed.

At 702, the UE may receive, from a base station, information indicating the relationship between a first subset of a set of antenna ports of a channel and a second subset of the set of antenna ports of the channel. The second subset of the set of antenna ports may include virtual antenna ports on which no pilot signals are configured to be transmitted from the base station. In some aspects, the relationship between the first subset of the set of antenna ports and the second subset of the set of antenna ports is based on one or more previous sets of values (e.g., measurements or other channel estimation values) corresponding to at least a portion of the first subset of the set of antenna ports and the second subset of the set of antenna ports.

In the context of FIG. 4, for example, the UE 404 may receive, from the base station 402, information indicating the relationship between a first subset of a set of antenna ports (e.g., the TX physical ports 422) associated with a channel 410 and a second subset of the set of antenna ports (e.g., the TX virtual ports 424) associated with the channel 410.

At 704, the UE may receive, from the base station, beamforming information indicating at least one of: directional beams of the base station corresponding to the first subset and the second subset of the set of antenna ports, or a relationship between the first subset and the second subset of the set of antenna ports.

In the context of FIG. 4, for example, the UE 404 may receive, from the base station 402, beamforming information indicating at least one of: directional beams of the base station 402 corresponding to the first subset of antenna ports (e.g., the TX physical ports 422) and the second subset of antenna ports (e.g., the TX virtual ports 424), or a relationship between the first subset of antenna ports (e.g., the TX physical ports 422) and the second subset of antenna ports (e.g., the TX virtual ports 424).

At 706, the UE may receive, from the base station, pilot signals transmitted by the base station on the first subset of the set of antenna ports of the channel. The UE may do so without the base station transmitting pilot signals on the second subset of the set of antenna ports of the channel, as the second subset of the set of antenna ports may be virtual antenna ports. In some aspects, the pilots signals may include RSs, such as CSI-RSs. In some other aspects, the pilot signals may include synchronization signals, such as SSBs.

In the context of FIG. 4, for example, the UE 404 may receive, via the RX antennas 426, pilot signals 416 transmitted by the base station 402 on the TX physical ports 422 associated with the channel 410. The UE 404 may not receive pilot signals 416 transmitted by the base station 402 on the TX virtual ports 424.

At 708, the UE may measure a first set of values corresponding to the first subset of the set of antenna ports based on receiving the pilot signals on the first subset of the set of antenna ports. For example, the UE may detect a pilot signal on each of the first subset of the set of antenna ports, such as an RS intended for the UE (e.g., an RS scrambled with a code or other information indicating the RS is intended for the UE) and/or an SSB that is broadcast in a cell operated by the base station (e.g., an SSB having an identifier associated with the cell). The UE may measure the energy with which each pilot signal is received to obtain a value corresponding to the pilot signal, e.g., in order to obtain an RSRP. Additionally or alternatively, the UE may measure the signal strength of the pilot signal and may also measure the interference and/or noise received with the pilot signal, such as by measuring the energy on at least one resource from which the pilot signal is removed or canceled or measuring the total energy of which the pilot signal is a portion. The UE may obtain a ratio (e.g., SNR) based on a quotient of the pilot signal signal strength divided by the interference and/or noise.

In the context of FIG. 4, for example, the UE 404 may measure a first set of values corresponding to the first subset of the set of antenna ports (e.g., the TX physical ports 422) based on receiving the pilot signals 416 transmitted by the base station 402 on the first subset of the set of antenna ports of the channel 410.

At 710, the UE may derive a second set of values corresponding to the second subset of the set of antenna ports of the channel based on receiving the pilot signals transmitted by the base station on the first subset of the set of antenna ports (and not the second subset of the set of antenna ports). For example, the UE may determine a relationship between the first subset of the set of antenna ports and the second subset of the set of antenna ports, and then the UE may estimate the second set of values associated with the second subset of the set of antenna ports using the pilot signals transmitted by the base station on the first subset of the set of antenna ports based on the relationship between the first subset of the set of antenna ports and the second subset of the set of antenna ports.

In the context of FIG. 4, for example, the UE 404 may derive a second set of values corresponding to the second subset of the set of antenna ports (e.g., the TX virtual ports 424) of the channel 410 based on receiving the pilot signals 416 transmitted by the base station 402 on the first subset of the set of antenna ports (e.g., the TX physical ports 422).

At 712, the UE may report information associated with the channel to the base station based on the first set of values and the second set of values. For example, where the pilot signals include CSI-RSs, the UE may transmit CSI associated with the channel to the base station based on the first set of values and the second set of values. In another example, where the pilot signals include SSBs, the UE may transmit information indicating at least one directional beam corresponding to at least one antenna port of the set of antenna ports based on the first set of values and the second set of values. In such an example, the UE may report the information indicating the at least one directional beam corresponding to the at least one antenna port of the set of antenna ports further based on the received beamforming information that indicates at least one of: directional beams of the base station corresponding to the first subset and the second subset of the set of antenna ports, or a relationship between the first subset and the second subset of the set of antenna ports.

In the context of FIG. 4, for example, the UE 404 may report information associated with the channel 410 to the base station 402 based on the first set of values and the second set of values. In some aspects, the information associated with the channel 410 reported by the UE 404 may include or may be based on output obtained from the neural network 406.

In some aspects, at 710, the UE may derive a second set of values corresponding to the second subset of the set of antenna ports of the channel based on receiving the pilot signals transmitted by the base station on the first subset of the set of antenna ports by:

At 722, the UE may provide the pilot signals transmitted by the base station on the first subset of the set of antenna ports as input into at least one function. For example, the at least one function may include a plurality of activation functions of a neural network. In some aspects, the neural network may be trained based on a relationship between the first subset of the set of antenna ports and the second subset of the set of antenna ports. For example, the neural network may include a weight matrix that is trained based on the relationship between the first subset of the set of antenna ports and the second subset of the set of antenna ports. In some other aspects, the neural network is trained based on training data comprising another set of pilot signals on the first subset and the second subset of the set of antenna ports (e.g., the other set of pilot signals may have been transmitted on the first subset and the second subset of the set of antenna ports).

In the context of FIG. 4, for example, the UE 404 may provide the pilot signals 416 transmitted by the base station 402 on the first subset of the set of antenna ports (e.g., the TX physical ports 422) as input into the neural network 406, which may include a plurality of activation functions 408 (e.g., sigmoid functions).

At 724, the UE may obtain output of the at least one function based on providing the pilot signals received on the first subset of the set of antenna ports. For example, the at least one function may include a neural network, and the UE may obtain output of the neural network that indicates the second set of values. The UE may respectively associate the second set of values with the second subset of antenna ports. In some aspects, the UE may determine information to report to the base station based on the second set of values output from the neural network. For example, the UE may obtain the second set of values as the output of the neural network, and then the UE may generate a CSI report (e.g., RI, PMI, CQI) using both the first set of values and the second set of values. In some other aspects, the UE may select at least one antenna port having a "best" or "highest" power or quality (e.g., a highest RSRP, a highest SNR, etc.) and/or having power or quality that satisfies (e.g., meets or exceeds) a threshold based on the second set of values (and the first set of values), and the at least one selected antenna port may index at least one directional beam of the base station.

In the context of FIG. 4, for example, the UE 404 may obtain the second set of values as output of the neural network 406 based on providing the pilot signals transmitted by the base station 102/180 on the first subset of the set of antenna ports (e.g., the TX physical ports 422). Accordingly, the UE 404 may derive channel information associated with a channel having a dimensionality of (number of TX physical ports 422+number of TX virtual ports 424)×(number of RX antennas 426), even though the UE 404 observed a channel having a dimensionality of (number of TX physical ports 422)×(number of RX antennas 426).

Figure 8:
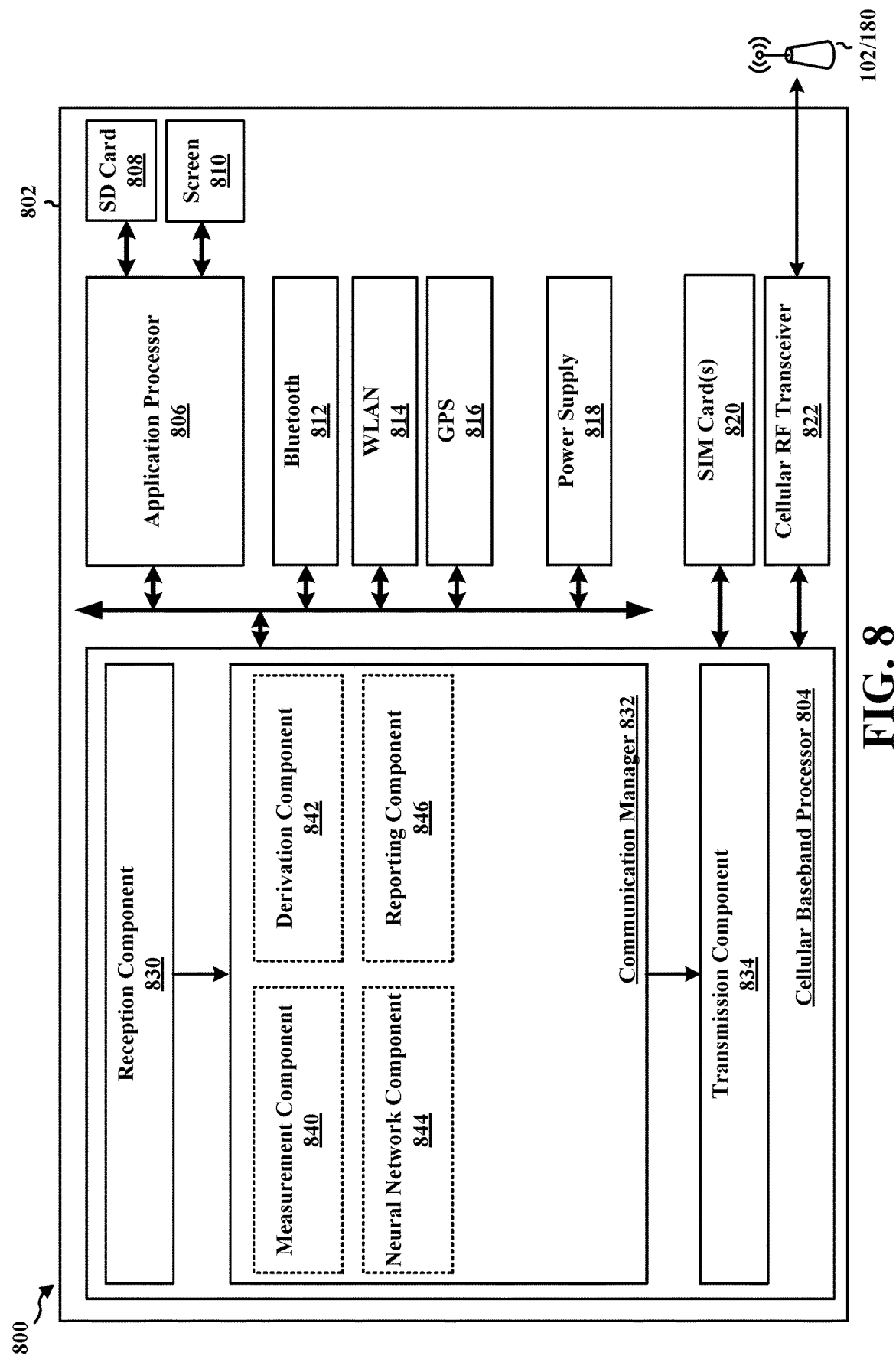
FIG. 8 is a diagram illustrating an example of a hardware implementation for an example apparatus.

FIG. 8 is a diagram 800 illustrating an example of a hardware implementation for an apparatus 802. The apparatus 802 may be a UE or similar device, or the apparatus 802 may be a component of a UE or similar device. The apparatus 802 may include a cellular baseband processor 804 (also referred to as a modem) and/or a cellular RF transceiver 822, which may be coupled together and/or integrated into the same package, component, circuit, chip, and/or other circuitry.

In some aspects, the apparatus 802 may accept or may include one or more subscriber identity modules (SIM) cards 820, which may include one or more integrated circuits, chips, or similar circuitry, and which may be removable or embedded. The one or more SIM cards 820 may carry identification and/or authentication information, such as an international mobile subscriber identity (IMSI) and/or IMSI-related key(s). Further, the apparatus 802 may include one or more of an application processor 806 coupled to a secure digital (SD) card 808 and a screen 810, a Bluetooth module 812, a wireless local area network (WLAN) module 814, a Global Positioning System (GPS) module 816, and/or a power supply 818.

The cellular baseband processor 804 communicates through the cellular RF transceiver 822 with the UE 104 and/or base station 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804.

In the context of FIG. 3, the cellular baseband processor 804 may be a component of the UE 350 and may include the memory 360 and/or at least one of the TX processor 368, the RX processor 356, and/or the controller/processor 359. In one configuration, the apparatus 802 may be a modem chip and/or may be implemented as the baseband processor 804, while in another configuration, the apparatus 802 may be the entire UE (e.g., the UE 350 of FIG. 3) and may include some or all of the abovementioned components, circuits, chips, and/or other circuitry illustrated in the context of the apparatus 802. In one configuration, the cellular RF transceiver 822 may be implemented as at least one of the transmitter 354TX and/or the receiver 354RX.

The reception component 830 may be configured to receive signaling on a wireless channel, such as signaling from a base station 102/180. The transmission component 834 may be configured to transmit signaling on a wireless channel, such as signaling to a base station 102/180. The communication manager 832 may coordinate or manage some or all wireless communications by the apparatus 802, including across the reception component 830 and the transmission component 834.

The reception component 830 may provide some or all data and/or control information included in received signaling to the communication manager 832, and the communication manager 832 may generate and provide some or all of the data and/or control information to be included in transmitted signaling to the transmission component 834. The communication manager 832 may include the various illustrated components, including one or more components configured to process received data and/or control information, and/or one or more components configured to generate data and/or control information for transmission.

In some aspects, the communication manager 832 may include at least a measurement component 840, a derivation component 842, a neural network component 844, and a reporting component 846.

The reception component 830 may be configured to receive, from the base station 102/180, information indicating the relationship between a first subset of a set of antenna ports of a channel and a second subset of the set of antenna ports of the channel, e.g., as described in connection with 702 of FIG. 7.

In some aspects, each antenna port of the second subset of the set of antenna ports comprises a virtual antenna port on which no pilot signal is transmitted from the base station 102/180. In some aspects, the relationship between the first subset of the set of antenna ports and the second subset of the set of antenna ports is based on one or more previous sets of values (e.g., measurements or other channel estimation values) corresponding to at least a portion of the first subset of the set of antenna ports and the second subset of the set of antenna ports.

The reception component 830 may be further configured to receive, from the base station 102/180, beamforming information indicating at least one of: directional beams of the base station 102/180 corresponding to the first subset and the second subset of the set of antenna ports, or a relationship between the first subset and the second subset of the set of antenna ports of the base station 102/180, e.g., as described in connection with 704 of FIG. 7.

The reception component 830 may be further configured to receive, from the base station 102/180, pilot signals on the first subset of the set of antenna ports of the channel, e.g., as described in connection with 706 of FIG. 7. The reception component 830 may do so without receiving pilot signals on the second subset of the set of antenna ports of the channel, as the second subset of the set of antenna ports may be virtual antenna ports on which no pilot signal is transmitted from the base station 102/180. In some aspects, the pilots signals may include RSs, such as CSI-RSs. In some other aspects, the pilot signals may include synchronization signals, such as SSBs.

The measurement component 840 may be configured to measure a first set of values corresponding to the first subset of the set of antenna ports based on receiving the pilot signals on the first subset of the set of antenna ports, e.g., as described in connection with 708 of FIG. 7. For example, the measurement component 840 may detect a pilot signal on each of the first subset of the set of antenna ports, such as an RS intended for the apparatus 802 (e.g., an RS scrambled with a code or other information indicating the RS is intended for the apparatus 802) and/or an SSB that is broadcast in a cell operated by the base station 102/180 (e.g., an SSB having an identifier associated with the cell). The measurement component 840 may measure the energy with which each pilot signal is received to obtain a value corresponding to the pilot signal, e.g., in order to obtain an RSRP. Additionally or alternatively, the measurement component 840 may measure the signal strength of the pilot signal and may also measure the interference and/or noise received with the pilot signal, such as by measuring the energy on at least one resource from which the pilot signal is removed or canceled or measuring the total energy of which the pilot signal is a portion. The measurement component 840 may obtain a ratio (e.g., SNR) based on a quotient of the pilot signal signal strength divided by the interference and/or noise.

The derivation component 842 may be configured to derive a second set of values corresponding to the second subset of the set of antenna ports of the channel based on receiving the pilot signals transmitted from the base station 102/180 on the first subset of the set of antenna ports, e.g., as described in connection with 710 of FIG. 7. For example, the derivation component 842 may determine a relationship between the first subset of the set of antenna ports and the second subset of the set of antenna ports, and then the derivation component 842 may estimate the second set of values associated with the second subset of the set of antenna ports using the pilot signals on the first subset of the set of antenna ports based on the relationship between the first subset of the set of antenna ports and the second subset of the set of antenna ports.

The reporting component 846 may be configured to report information associated with the channel to the base station 102/180 based on the first set of values and the second set of values, e.g., as described in connection with 712 of FIG. 7. For example, where the pilot signals include CSI-RSs, the reporting component 846 may cause the transmission component 834 to transmit CSI associated with the channel to the base station 102/180 based on the first set of values and the second set of values.

In another example, where the pilot signals include SSBs, the reporting component 846 may cause the transmission component 834 to transmit information indicating at least one directional beam corresponding to at least one antenna port of the set of antenna ports based on the first set of values and the second set of values. In such an example, the reporting component 846 may report the information indicating the at least one directional beam corresponding to the at least one antenna port to the base station 102/180 further based on the received beamforming information that indicates at least one of: the directional beams of the base station 102/180 corresponding to the first subset and the second subset of the set of antenna ports, or the relationship between the first subset and the second subset of the set of antenna ports of the base station 102/180.

In some aspects, the derivation component 842 may be configured to derive a second set of values corresponding to the second subset of the set of antenna ports of the channel based on the first set of values corresponding to the first subset of the set of antenna ports by coordinating with the neural network component 844.

The neural network component 844 may be configured to provide the first set of values corresponding to the first subset of the set of antenna ports as input into at least one function, e.g., as described in connection with 722 of FIG. 7. In some aspects, the at least one function may include a plurality of activation functions of a neural network. The neural network may be trained based on a relationship between the first subset of the set of antenna ports and the second subset of the set of antenna ports. For example, the neural network may include a weight matrix that is trained based on the relationship between the first subset of the set of antenna ports and the second subset of the set of antenna ports. For example, the relationship may be based on data observed from one or more previous sets of pilot signals received on at least a portion of the set of antenna ports and/or may be based on information indicating the relationship between the first subset of the set of antenna ports and the second subset of the set of antenna ports received from the base station 102/180. In another example, the neural network may be trained based on training data that includes another set of pilot signals on the first subset and the second subset of the set of antenna ports (e.g., where the other set of pilot signals may have been transmitted on both the first subset and the second subset of the set of antenna ports).

The neural network component 844 may be further configured to obtain output of the at least one function based on providing the pilot signals received on the first subset of the set of antenna ports, e.g., as described in connection with 724 of FIG. 7. For example, the neural network component 844 may receive an output of the neural network that indicates the second set of values, and the neural network component 844 may respectively associate the second set of values with the second subset of antenna ports. In some aspects, the neural network component 844 may determine information to report to the base station 102/180 based on the second set of values output from the neural network. For example, the neural network component 844 may obtain the second set of values as the output of the neural network, and then the neural network component 844 may generate a CSI report (e.g., RI, PMI, CQI) using both the first set of values and the second set of values. In another example, the neural network component 844 may generate a report from the output that indicates at least one directional beam of the base station 102/180 based on the first set of values and the second set of values.

The apparatus 802 may include additional components that perform some or all of the blocks, operations, signaling, etc. of the algorithm(s) in the aforementioned flowchart of FIG. 7. As such, some or all of the blocks, operations, signaling, etc. in the aforementioned flowchart of FIG. 7 may be performed by one or more components and the apparatus 802 may include one or more such components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes: means for receiving pilot signals from a base station 102/180 on a first subset of a set of antenna ports of a channel; means for measuring a first set of values corresponding to the first subset of the set of antenna ports based on receiving the pilot signals transmitted from the base station 102/180 on the first subset of the set of antenna ports; and means for deriving a second set of values corresponding to a second subset of the set of antenna ports of the channel based on receiving the pilot signals on the first subset of the set of antenna ports.

In one configuration, each antenna port of the second subset of the set of antenna ports includes a virtual antenna port on which no pilot signal is transmitted from the base station 102/180 to the apparatus 802.

In one configuration, the means for deriving the second set of values corresponding to the second subset of the set of antenna ports of the channel is configured to: provide the pilot signals received on the first subset of the set of antenna ports as input into at least one function; and obtain output of the at least one function based on providing the pilot signals received on the first subset of the set of antenna ports, and the second set of values is derived based on the output.

In one configuration, the at least one function includes a neural network.

In one configuration, the neural network is trained based on a relationship between the first subset of the set of antenna ports and the second subset of the set of antenna ports.

In one configuration, the apparatus 802, and in particular the cellular baseband processor 804, further includes: means for receiving, from the base station 102/180, information indicating the relationship between the first subset of the set of antenna ports and the second subset of the set of antenna ports.

In one configuration, the neural network is trained based on training data including another set of pilot signals on the first subset and the second subset of the set of antenna ports.

In one configuration, the apparatus 802, and in particular the cellular baseband processor 804, further includes: means for reporting, to the base station 102/180, CSI associated with the channel based on the first set of values and the second set of values, and the pilot signals include CSI-RSs.

In one configuration, the apparatus 802, and in particular the cellular baseband processor 804, further includes: means for reporting, to the base station 102/180, information indicating at least one directional beam corresponding to at least one antenna port of the set of antenna ports based on the first set of values and the second set of values, and the pilot signals include SSBs.

In one configuration, the apparatus 802, and in particular the cellular baseband processor 804, further includes: means for receiving beamforming information indicating at least one of: directional beams of the base station 102/180 corresponding to the first subset and the second subset of the set of antenna ports, or a relationship between the first subset and the second subset of the set of antenna ports of the base station 102/180, and the information indicating the at least one directional beam is reported to the base station 102/180 further based on the beamforming information.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
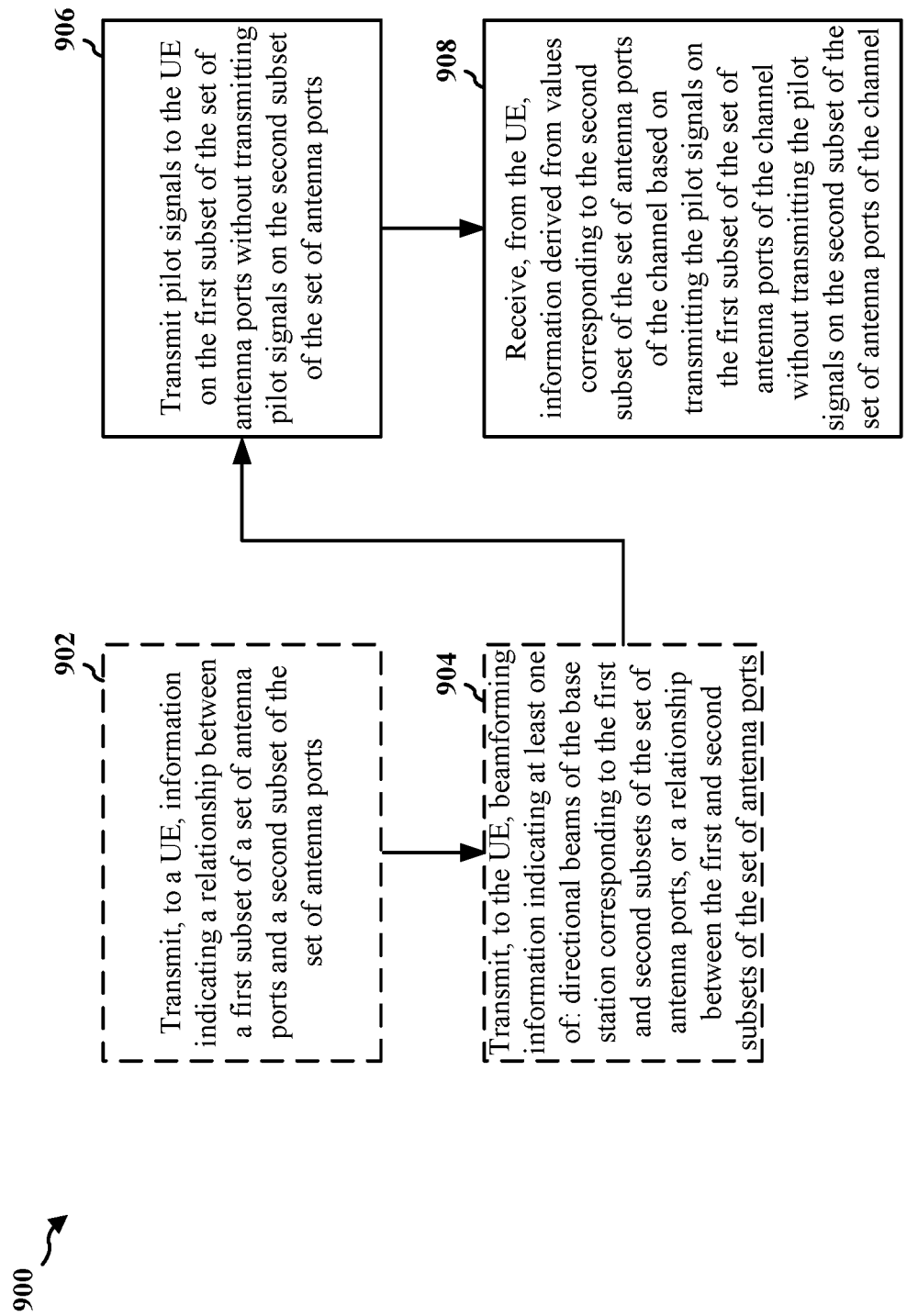
FIG. 9 is a flowchart illustrating an example of a method of wireless communication at a base station.

FIG. 9 is a flowchart 900 of a method of wireless communication. The method may be performed by or at base station (e.g., the base station 102/180, 310, 402), another wireless communications apparatus (e.g., the apparatus 1002), or one or more components thereof. According to various different aspects, one or more of the illustrated blocks may be omitted, transposed, and/or contemporaneously performed.

At 902, the base station may transmit, to a UE, information indicating a relationship between a first subset of a set of antenna ports of a channel and a second subset of the set of antenna ports of the channel. The second subset of the set of antenna ports may include virtual antenna ports on which no pilot signals are configured to be transmitted. In some aspects, the relationship between the first subset of the set of antenna ports and the second subset of the set of antenna ports is based on one or more previous sets of values (e.g., measurements or other channel estimation values) corresponding to at least a portion of the first subset of the set of antenna ports and the second subset of the set of antenna ports.

In the context of FIG. 4, for example, the base station 402 may transmit, to the UE 404, information indicating the relationship between a first subset of a set of antenna ports (e.g., the TX physical ports 422) associated with a channel 410 and a second subset of the set of antenna ports (e.g., the TX virtual ports 424) associated with the channel 410.

At 904, the base station may transmit, to the UE, beamforming information indicating at least one of: directional beams of the base station corresponding to the first subset and the second subset of the set of antenna ports, or a relationship between the first subset and the second subset of the set of antenna ports.

In the context of FIG. 4, for example, the base station 402 may transmit, to the UE 404, beamforming information indicating at least one of: directional beams of the base station 402 corresponding to the first subset of antenna ports (e.g., the TX physical ports 422) and the second subset of antenna ports (e.g., the virtual ports 424), or a relationship between the first subset of antenna ports (e.g., the TX physical ports 422) and the second subset of antenna ports (e.g., the TX virtual ports 424).

At 906, the base station may transmit, to the UE, pilot signals on the first subset of the set of antenna ports of the channel. The base station may do so without transmitting pilot signals on the second subset of the set of antenna ports of the channel, as the second subset of the set of antenna ports may be virtual antenna ports. In some aspects, the pilots signals may include RSs, such as CSI-RSs. In some other aspects, the pilot signals may include synchronization signals, such as SSBs.

In the context of FIG. 4, for example, the base station 402 may transmit, to the UE 404, pilot signals 416 on the physical ports 422 associated with the channel 410. The UE 404 may receive the pilot signals transmitted on the TX physical ports 422 via the RX antennas 426.

At 908, the base station may receive, from the UE, information derived from values corresponding to the second subset of the set of antenna ports of the channel based on transmitting the pilot signals on the first subset of the set of antenna ports of the channel without transmitting the pilot signals on the second subset of the set of antenna ports of the channel. For example, where the pilot signals include CSI-RSs, the base station may receive CSI associated with the channel from the UE, and the CSI may include information for one or both of the first and second subsets of antenna ports.

In another example, where the pilot signals include SSBs, the base station may receive information indicating at least one directional beam corresponding to at least one of the set of antenna ports, which may be an antenna port selected from the second subset of antenna ports (or an antenna port selected from the first subset of antenna ports). In such an example, the base station may receive the information indicating the at least one directional beam from the UE further based on the transmitted beamforming information that indicates at least one of: directional beams of the base station corresponding to the first subset and the second subset of the set of antenna ports, or a relationship between the first subset and the second subset of the set of antenna ports.

The information derived from the values corresponding to the second subset of the set of antenna ports of the channel may be based on output of a neural network. In some aspects, the neural network may be trained to output the second set of values based on the relationship between the first subset of the set of antenna ports and the second subset of the set of antenna ports. For example, the neural network may include a weight matrix that is based on the relationship between the first subset of the set of antenna ports and the second subset of the set of antenna ports. For example, the relationship may be based on data observed from one or more previous sets of pilot signals received on at least a portion of the set of antenna ports and/or may be based on information indicating the relationship between the first subset of the set of antenna ports and the second subset of the set of antenna ports transmitted to the UE. In some other aspects, the neural network may be trained based on training data comprising another set of pilot signals on the first subset and the second subset of the set of antenna ports (e.g., the other set of pilot signals may have been transmitted on both the first and second subsets of the set of antenna ports).

In the context of FIG. 4, for example, the base station 402 may receive information derived from values corresponding to the second subset of the set of antenna ports (e.g., the TX virtual ports 424) associated with the channel 410 based on transmitting the pilot signals 416 on the first subset of the set of antenna ports (e.g., the TX physical ports 422) associated with the channel 410 without transmitting the pilot signals on the second subset of the set of antenna ports associated with the channel (e.g., the TX virtual ports 424). In some aspects, the information associated with the channel 410 received by the base station 102/180 may include or may be based on output obtained from the neural network 406.

Figure 10:
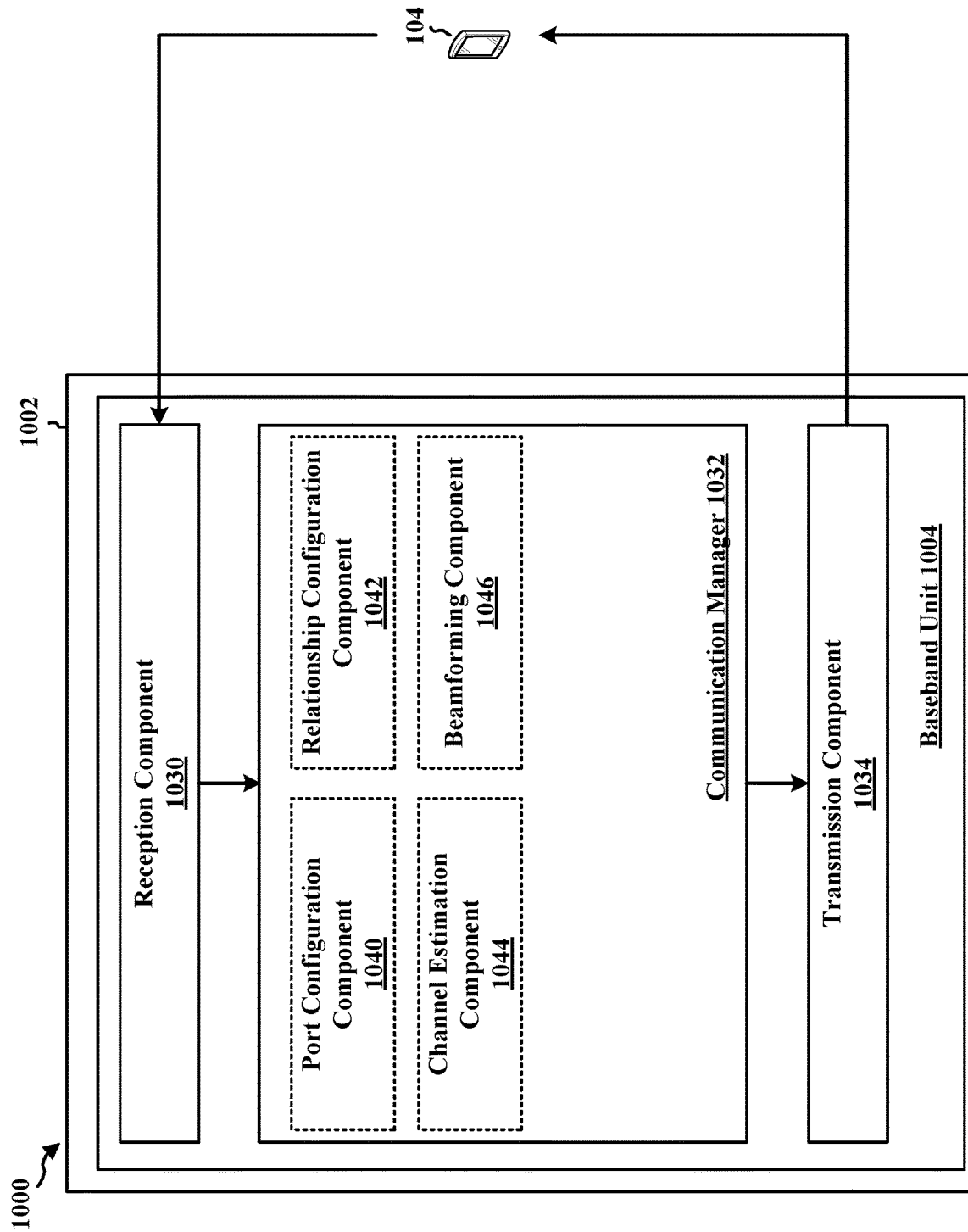
FIG. 10 is a diagram illustrating another example of a hardware implementation for another example apparatus.

FIG. 10 is a diagram 1000 illustrating an example of a hardware implementation for an apparatus 1002. The apparatus 1002 may be a base station or similar device or system, or the apparatus 1002 may be a component of a base station or similar device or system. The apparatus 1002 may include a baseband unit 1004. The baseband unit 1004 may communicate through a cellular RF transceiver. For example, the baseband unit 1004 may communicate through a cellular RF transceiver with a UE 104, such as for downlink and/or uplink communication, and/or with a base station 102/180, such as for IAB.

The baseband unit 1004 may include a computer-readable medium/memory, which may be non-transitory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The reception component 1030 may be configured to receive signaling on a wireless channel, such as signaling from a UE 104 or base station 102/180. The transmission component 1034 may be configured to transmit signaling on a wireless channel, such as signaling to a UE 104 or base station 102/180. The communication manager 1032 may coordinate or manage some or all wireless communications by the apparatus 1002, including across the reception component 1030 and the transmission component 1034.

The reception component 1030 may provide some or all data and/or control information included in received signaling to the communication manager 1032, and the communication manager 1032 may generate and provide some or all of the data and/or control information to be included in transmitted signaling to the transmission component 1034. The communication manager 1032 may include the various illustrated components, including one or more components configured to process received data and/or control information, and/or one or more components configured to generate data and/or control information for transmission. In some aspects, the generation of data and/or control information may include packetizing or otherwise reformatting data and/or control information received from a core network, such as the core network 190 or the EPC 160, for transmission.

The communication manager 1032 may include a port configuration component 1040, a relationship configuration component 1042, channel estimation component 1044, and/or a beamforming component 1046.

The port configuration component 1040 may configure some or all of the antenna to be virtual ports on which no pilot signals are transmitted. Further, the port configuration component 1040 may configure the remaining ports for transmission of pilot signals (non-virtual or physical ports). In addition, the relationship configuration component 1042 may determine the relationship between the first subset of the set of antenna ports and the second subset of the set of antenna ports, which may be used by the UE 104 for beamforming. The transmission component 1034 may be configured to transmit, to the UE 104, information indicating the relationship between the first subset of the set of antenna ports and the second subset of the set of antenna ports, e.g., as described in connection with 902 of FIG. 9.

The relationship configuration component 1042 may configure beamforming information indicating at least one of: directional beams of the apparatus 1002 corresponding to the first subset and the second subset of the set of antenna ports, or a relationship between the first subset and the second subset of the set of antenna ports. The transmission component 1034 may transmit such information to the UE 104, e.g., as described in connection with 904 of FIG. 9.

The transmission component 1034 may be configured to transmit, to the UE 104, pilot signals on the first subset of the set of antenna ports of the channel, e.g., as described in connection with 906 of FIG. 9. The transmission component 1034 may do so without transmitting pilot signals on the second subset of the set of antenna ports of the channel, as the second subset of the set of antenna ports may be virtual antenna ports. In some aspects, the pilots signals may include RSs, such as CSI-RSs. In some other aspects, the pilot signals may include synchronization signals, such as SSBs.

The reception component 1030 may be configured to receive, from the UE 104, information derived from values corresponding to the second subset of the set of antenna ports of the channel based on transmitting the pilot signals on the first subset of the set of antenna ports of the channel without transmitting the pilot signals on the second subset of the set of antenna ports of the channel, e.g., as described in connection with 908 of FIG. 9. For example, where the pilot signals include CSI-RSs, the channel estimation component 1044 may receive CSI associated with the channel from the UE 104. The CSI may include information for one or both of the first and second subsets of antenna ports, the channel estimation component 1044 may estimate the underlying channel and/or may otherwise configure communication with the UE 104 based on the information reported by the UE 104.

In another example, where the pilot signals include SSBs, the beamforming component 1046 may receive information indicating at least one directional beam corresponding to at least one of the set of antenna ports, which may be an antenna port selected from the second subset of antenna ports (or an antenna port selected from the first subset of antenna ports). In such an example, the beamforming component 1046 may receive the information indicating the at least one directional beam corresponding to the at least one of the set of antenna ports further based on the transmitted beamforming information that indicates at least one of: directional beams of the apparatus 1002 corresponding to the first subset and the second subset of the set of antenna ports, or a relationship between the first subset and the second subset of the set of antenna ports.

The apparatus 1002 may include additional components that perform some or all of the blocks, operations, signaling, etc. of the algorithm(s) in the aforementioned flowchart of FIG. 9. As such, some or all of the blocks, operations, signaling, etc. in the aforementioned flowchart of FIG. 9 may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes: means for transmitting pilot signals to a UE 104 on a first subset of a set of antenna ports of a channel without transmitting the pilot signals on a second subset of the set of antenna ports of the channel; and means for receiving, from the UE 104, information derived from values corresponding to the second subset of the set of antenna ports of the channel based on transmitting the pilot signals on the first subset of the set of antenna ports of the channel without transmitting the pilot signals on the second subset of the set of antenna ports of the channel.

In one configuration, the second subset of the set of antenna ports includes virtual antenna ports on which none of the pilot signals is transmitted to the UE 104.

In one configuration, the information derived from the values corresponding to the second subset of the set of antenna ports of the channel is based on output of a neural network.

In one configuration, the neural network is trained based on a relationship between the first subset of the set of antenna ports and the second subset of the set of antenna ports.

In one configuration, the apparatus 1002, and in particular the baseband unit 1004, further includes: means for transmitting, to the UE 104, information indicating the relationship between the first subset of the set of antenna ports and the second subset of the set of antenna ports.

In one configuration, the neural network is trained based on training data including another set of pilot signals on the first subset and the second subset of the set of antenna ports.

In one configuration, the information derived from values corresponding to the second subset of the set of antenna ports of the channel includes CSI associated with the channel, and the pilot signals include CSI-RSs.

In one configuration, the information derived from values corresponding to the second subset of the set of antenna ports of the channel includes information indicating at least one directional beam corresponding to at least one of the set of antenna ports, and the pilot signals include SSBs.

In one configuration, the apparatus 1002, and in particular the baseband unit 1004, further includes: means for transmitting, to the UE 104, beamforming information indicating at least one of: directional beams of the apparatus 1002 corresponding to the first subset and the second subset of the set of antenna ports, or a relationship between the first subset and the second subset of the set of antenna ports, and the information derived from values corresponding to the second subset of the set of antenna ports of the channel is further based on the beamforming information.

The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The specific order or hierarchy of blocks or operations in each of the foregoing processes, flowcharts, and other diagrams disclosed herein is an illustration of example approaches. Based upon design preferences, one of ordinary skill will readily recognize that the specific order or hierarchy of blocks each the processes, flowcharts, and other diagrams may be rearranged, omitted, and/or contemporaneously performed without departing from the scope of the present disclosure. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method that may be implemented at a UE or a component thereof, including: receiving pilot signals from a base station on a first subset of a set of antenna ports of a channel; measuring a first set of values corresponding to the first subset of the set of antenna ports based on receiving the pilot signals transmitted from the base station on the first subset of the set of antenna ports; and deriving a second set of values corresponding to a second subset of the set of antenna ports of the channel based on receiving the pilot signals on the first subset of the set of antenna ports.

Example 2 may include the method of Example 1, and each antenna port of the second subset of the set of antenna ports includes a virtual antenna port on which no pilot signal is transmitted from the base station to the UE.

Example 3 may include the method of Example 1, and the deriving the second set of values corresponding to the second subset of the set of antenna ports of the channel includes: providing the pilot signals received on the first subset of the set of antenna ports as input into at least one function; and obtaining output of the at least one function based on providing the pilot signals received on the first subset of the set of antenna ports, wherein the second set of values is derived based on the output.

Example 4 may include the method of Example 3, and the at least one function includes a neural network.

Example 5 may include the method of Example 4, and the neural network is trained based on a relationship between the first subset of the set of antenna ports and the second subset of the set of antenna ports.

Example 6 may include the method of Example 5, and further including: receiving, from the base station, information indicating the relationship between the first subset of the set of antenna ports and the second subset of the set of antenna ports.

Example 7 may include the method of Example 4, and the neural network is trained based on training data including another set of pilot signals on the first subset and the second subset of the set of antenna ports.

Example 8 may include the method of Example 1, and further including: reporting, to the base station, CSI associated with the channel based on the first set of values and the second set of values, and the pilot signals include CSI-RSs.

Example 9 may include the method of Example 1, and further including: reporting, to the base station, information indicating at least one directional beam corresponding to at least one antenna port of the set of antenna ports based on the first set of values and the second set of values, and the pilot signals include SSBs.

Example 10 may include the method of Example 9, and further including: receiving beamforming information indicating at least one of: directional beams of the base station corresponding to the first subset and the second subset of the set of antenna ports, or a relationship between the first subset and the second subset of the set of antenna ports of the base station, and the information indicating the at least one directional beam is reported to the base station further based on the beamforming information.

Example 11 is a method that may be implemented at a base station or a component thereof, including: transmitting pilot signals to a UE on a first subset of a set of antenna ports of a channel without transmitting the pilot signals on a second subset of the set of antenna ports of the channel; and receiving, from the UE, information derived from values corresponding to the second subset of the set of antenna ports of the channel based on transmitting the pilot signals on the first subset of the set of antenna ports of the channel without transmitting the pilot signals on the second subset of the set of antenna ports of the channel.

Example 12 may include the method of Example 11, and the second subset of the set of antenna ports includes virtual antenna ports on which none of the pilot signals is transmitted to the UE.

Example 13 may include the method of Example 11, and the information derived from the values corresponding to the second subset of the set of antenna ports of the channel is based on output of a neural network.

Example 14 may include the method of Example 13, and the neural network is trained based on a relationship between the first subset of the set of antenna ports and the second subset of the set of antenna ports.

Example 15 may include the method of Example 14, and further including: transmitting, to the UE, information indicating the relationship between the first subset of the set of antenna ports and the second subset of the set of antenna ports.

Example 16 may include the method of Example 14, and the neural network is trained based on training data including another set of pilot signals on the first subset and the second subset of the set of antenna ports.

Example 17 may include the method of Example 11, and the information derived from values corresponding to the second subset of the set of antenna ports of the channel includes CSI associated with the channel, and the pilot signals include CSI-RSs.

Example 18 may include the method of Example 11, and the information derived from values corresponding to the second subset of the set of antenna ports of the channel includes information indicating at least one directional beam corresponding to at least one of the set of antenna ports, and the pilot signals include SSBs.

Example 19 may include the method of Example 18, and further including: transmitting, to the UE, beamforming information indicating at least one of: directional beams of the base station corresponding to the first subset and the second subset of the set of antenna ports, or a relationship between the first subset and the second subset of the set of antenna ports, and the information derived from values corresponding to the second subset of the set of antenna ports of the channel is further based on the beamforming information.

The previous description is provided to enable any person of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include communication and/or memory operations/procedures through which information or value(s) are acquired, such as "receiving" (e.g., receiving information), "accessing" (e.g., accessing data in a memory), "detecting," and the like.

As another example, reference to an element in the singular is not intended to mean "one and only one" unless specifically stated, but rather "one or more." Further, terms such as "if," "when," and "while" should be interpreted to mean "under the condition that" rather than imply an immediate temporal relationship or reaction. That is, these phrases, e.g., "when," do not imply an immediate action in response to or during the occurrence of an action or event, but rather imply that if a condition is met then another action or event will occur, but without requiring a specific or immediate time constraint or direct correlation for the other action or event to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving pilot signals from a base station on a first subset of a set of antenna ports of a channel without receiving the pilot signals on a second subset of the set of antenna ports of the channel;
   measuring a first set of values corresponding to the first subset of the set of antenna ports based on receiving the pilot signals transmitted from the base station on the first subset of the set of antenna ports;
   deriving, at the UE, a second set of values corresponding to the second subset of the set of antenna ports of the channel based on receiving the pilot signals on the first subset of the set of antenna ports without receiving the pilot signals on the second subset of the set of antenna ports of the channel; and
   reporting, to the base station, information using the first set of values and the second set of values and associated with a dimensionality of the channel including the first subset of the set of antenna ports and the second subset of the set of antenna ports.

2. The method of claim 1, wherein each antenna port of the second subset of the set of antenna ports comprises a virtual antenna port on which no pilot signal is transmitted from the base station to the UE.

3. The method of claim 1, wherein the deriving the second set of values corresponding to the second subset of the set of antenna ports of the channel comprises:
   providing the pilot signals received on the first subset of the set of antenna ports as input into at least one function; and
   obtaining output of the at least one function based on providing the pilot signals received on the first subset of the set of antenna ports,
   wherein the second set of values is derived based on the output.

4. The method of claim 3, wherein the at least one function comprises a neural network.

5. The method of claim 4, wherein the neural network is trained based on a relationship between the first subset of the set of antenna ports and the second subset of the set of antenna ports.

6. The method of claim 5, further comprising:
   receiving, from the base station, information indicating the relationship between the first subset of the set of antenna ports and the second subset of the set of antenna ports.

7. The method of claim 4, wherein the neural network is trained based on training data comprising another set of pilot signals on the first subset and the second subset of the set of antenna ports.

8. The method of claim 1,
   wherein the information includes channel state information (CSI) associated with the channel based on the first set of values and the second set of values,
   wherein the pilot signals comprise CSI reference signals (CSI-RSs).

9. The method of claim 1,
   wherein the information includes beamforming information indicating at least one directional beam corresponding to at least one antenna port of the set of antenna ports based on the first set of values and the second set of values,
   wherein the pilot signals comprise synchronization signal blocks (SSBs).

10. The method of claim 9, further comprising:
receiving an indication of at least one of:
directional beams of the base station corresponding to the first subset and the second subset of the set of antenna ports, or
a relationship between the first subset and the second subset of the set of antenna ports of the base station,
wherein the beamforming information is further based on the indication.

11. A method of wireless communication at a base station, comprising:
transmitting pilot signals to a user equipment (UE) on a first subset of a set of antenna ports of a channel without transmitting the pilot signals on a second subset of the set of antenna ports of the channel; and
receiving, from the UE, information using a first set of values corresponding to the first subset of the set of antenna ports and a second set of values corresponding to the second subset of the set of antenna ports, the information associated with a dimensionality of the channel including the first subset of the set of antenna ports and the second subset of the set of antenna ports, the second set of values being derived based on transmitting the pilot signals on the first subset of the set of antenna ports of the channel without transmitting the pilot signals on the second subset of the set of antenna ports of the channel.

12. The method of claim 11, wherein the second subset of the set of antenna ports comprises virtual antenna ports on which none of the pilot signals is transmitted to the UE.

13. The method of claim 11, wherein the second set of values is based on output of a neural network.

14. The method of claim 13, wherein the neural network is trained based on a relationship between the first subset of the set of antenna ports and the second subset of the set of antenna ports.

15. The method of claim 14, further comprising:
transmitting, to the UE, information indicating the relationship between the first subset of the set of antenna ports and the second subset of the set of antenna ports.

16. The method of claim 14, wherein the neural network is trained based on training data comprising another set of pilot signals on the first subset and the second subset of the set of antenna ports.

17. The method of claim 11, wherein the information comprises channel state information (CSI) associated with the channel, and wherein the pilot signals comprise CSI reference signals (CSI-RSs).

18. The method of claim 11, wherein the information comprises beamforming information indicating at least one directional beam corresponding to at least one of the set of antenna ports, and wherein the pilot signals comprise synchronization signal blocks (SSBs).

19. The method of claim 18, further comprising:
transmitting, to the UE, an indication of at least one of:
directional beams of the base station corresponding to the first subset and the second subset of the set of antenna ports, or
a relationship between the first subset and the second subset of the set of antenna ports,
wherein the beamforming information is further based on the indication.

20. An apparatus for wireless communication at a user equipment (UE), comprising:
one or more processors;
one or more memories each coupled with at least one of the one or more processors; and
instructions stored in the one or more memories and operable, when executed by the one or more processors individually or in combination, to cause the apparatus to:
receive pilot signals from a base station on a first subset of a set of antenna ports of a channel without receiving the pilot signals on a second subset of the set of antenna ports of the channel;
measure a first set of values corresponding to the first subset of the set of antenna ports based on reception of the pilot signals transmitted from the base station on the first subset of the set of antenna ports;
derive, at the UE, a second set of values corresponding to the second subset of the set of antenna ports of the channel based on reception of the pilot signals on the first subset of the set of antenna ports without reception of the pilot signals on the second subset of the set of antenna ports of the channel; and
report, to the base station, information using the first set of values and the second set of values and associated with a dimensionality of the channel including the first subset of the set of antenna ports and the second subset of the set of antenna ports.

21. The apparatus of claim 20, wherein each antenna port of the second subset of the set of antenna ports comprises a virtual antenna port on which no pilot signal is transmitted from the base station to the UE.

22. The apparatus of claim 20, wherein the instructions stored in the one or more memories are further operable, when executed by the one or more processors individually or in combination, to cause the apparatus to:
provide the pilot signals received on the first subset of the set of antenna ports as input into at least one function; and
obtain output of the at least one function based on providing the pilot signals received on the first subset of the set of antenna ports,
wherein the second set of values is derived based on the output.

23. The apparatus of claim 22, wherein the at least one function comprises a neural network.

24. The apparatus of claim 23, wherein the neural network is trained based on a relationship between the first subset of the set of antenna ports and the second subset of the set of antenna ports.

25. The apparatus of claim 23, wherein the neural network is trained based on training data comprising another set of pilot signals on the first subset and the second subset of the set of antenna ports.

26. The apparatus of claim 20, wherein
the information includes channel state information (CSI) associated with the channel based on the first set of values and the second set of values,
wherein the pilot signals comprise CSI reference signals (CSI-RSs).

27. The apparatus of claim 20, wherein
the information includes beamforming information indicating at least one directional beam corresponding to at least one antenna port of the set of antenna ports based on the first set of values and the second set of values,
wherein the pilot signals comprise synchronization signal blocks (SSBs).

28. An apparatus for wireless communication at a base station, comprising:
one or more processors;
one or more memories each coupled with at least one of the one or more processors; and instructions stored in the one or more memories and operable, when executed by the one or more processors individually or in combination, to cause the apparatus to:

transmit pilot signals to a user equipment (UE) on a first subset of a set of antenna ports of a channel without transmission of the pilot signals on a second subset of the set of antenna ports of the channel; and receive, from the UE, information using a first set of values corresponding to the first subset of the set of antenna ports and a second set of values corresponding to the second subset of the set of antenna ports, the information associated with a dimensionality of the channel including the first subset of the set of antenna ports and the second subset of the set of antenna ports, the second set of values being derived based on transmission of the pilot signals on the first subset of the set of antenna ports of the channel without transmission of the pilot signals on the second subset of the set of antenna ports of the channel.

29. The apparatus of claim 28, wherein the second subset of the set of antenna ports comprises virtual antenna ports on which none of the pilot signals is transmitted to the UE.

30. The apparatus of claim 28, wherein the second set of values is based on output of a neural network.

* * * * *